Dec. 21, 1965  H. S. DAVIS  3,224,457
SEQUENCING VALVE
Filed Nov. 21, 1962  3 Sheets-Sheet 1
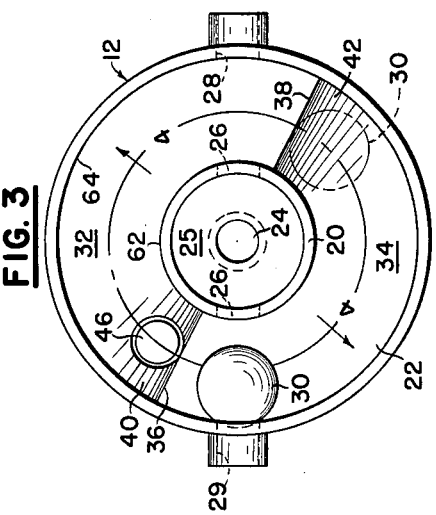
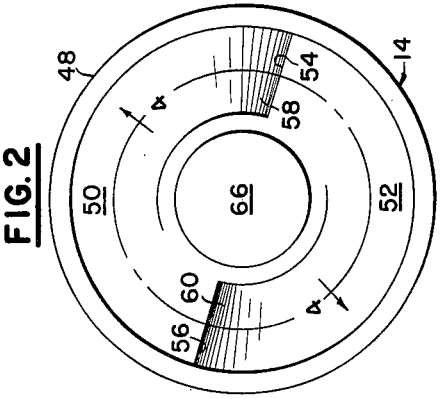
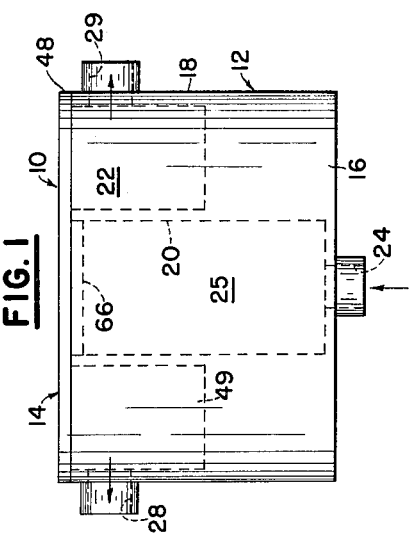
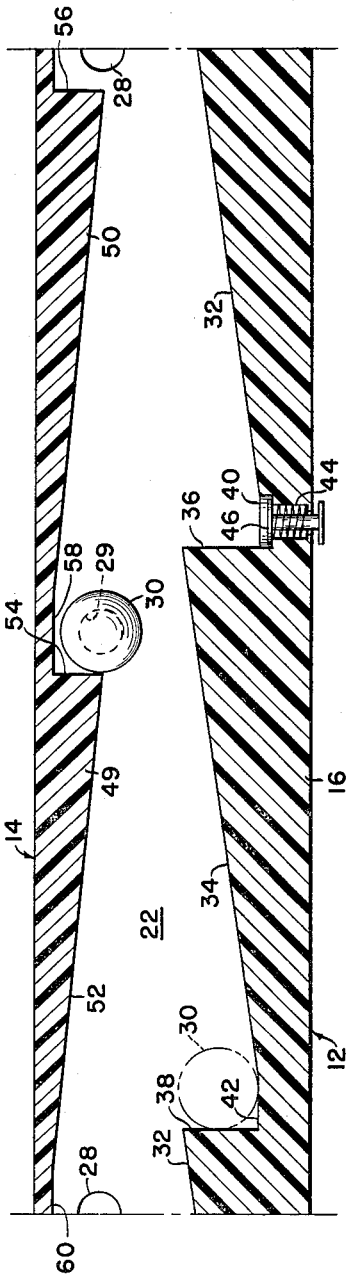
INVENTOR.
HARRY S. DAVIS
BY
*Raymond W. Wootten*
ATTORNEY Dec. 21, 1965 H. S. DAVIS 3,224,457
SEQUENCING VALVE
Filed Nov. 21, 1962 3 Sheets-Sheet 2

INVENTOR.
HARRY S. DAVIS
BY
Raymond W Cotton
ATTORNEY

Dec. 21, 1965 H. S. DAVIS 3,224,457
SEQUENCING VALVE

Filed Nov. 21, 1962 3 Sheets-Sheet 3

INVENTOR.
HARRY S. DAVIS
BY
Raymond W. Cotton
ATTORNEY

United States Patent Office 3,224,457
Patented Dec. 21, 1965

3,224,457
SEQUENCING VALVE
Harry S. Davis, Fort Lauderdale, Fla., assignor to Davis Flow Valve, Inc., Fort Lauderdale, Fla., a corporation of Florida
Filed Nov. 21, 1962, Ser. No. 239,226
11 Claims. (Cl. 137—119)

This application is a continuation-in-part of an application entitled, Davis Flow Control Valve, Serial Number 206,556, filed June 28, 1962, now abandoned.

This invention relates to valves, and more specifically to a sequencing valve operable to selectively deliver a fluid under pressure from a source to one or more discharge or distribution lines at predetermined intervals.

While not limited thereto, this invention finds especial application in irrigation systems, wherein water from a supply, such as from a reservoir, well, or city main, is delivered, in sequence, to a number of distribution lines which may have sprinkler or spray heads and the like. Such systems usually include at least one sequencing valve which is operable to deliver water to the several distribution lines, one at a time, at desired intervals in a predetermined sequence. The sequencing valve or valves may be manually actuated, but are frequently actuated by a timing mechanism which controls the time that the sequencing operation begins and also controls the sequencing intervals. Heretofore such systems included a valve in each distribution line which is opened and closed, hydraulically and/or electrically, by the timing mechanism, or a single rotary valve is provided to control a plurality of distribution lines to sequentially deliver water to one or more lines. Such known systems require a number of valves, or a single valve having a number of moving parts, and are costly to install and frequently require expensive servicing.

It is an object of this invention to provide a novel sequencing valve which is economical to manufacture and which is fool proof in operation.

It is a further object to provide a novel sequencing valve which is operable, in response to the supply of fluid to the valve and to the cessation of supply thereto, to sequentially supply fluid to the several distribution lines.

It is a still further object to provide a novel sequencing system having, as the only moving parts, one or more freely movable valve elements, at least one less than the number of outlets, which are movable by the flow of fluid when said fluid is supplied to the valve, to move the valve elements into one position to obstruct flow from one or more outlets and to permit flow through at least one outlet, and which are movable into an intermediate position by gravity, upon cessation of fluid supply to the valve, to open all outlets, and from which intermediate position the valve elements may be subsequently carried by the fluid, when fluid flow is restored, into a different fluid flow controlling position.

It is a still further object to provide a novel sequencing valve having walls of such contour, and a freely movable ball valve element or ball valve elements cooperable with the walls and with the outlets, to sequentially move the valve element as elements, in response to the supply of fluid to the valve and to the cessation of supply thereto, to produce a sequential flow of fluid through at least one outlet.

The attainment of the above objects, as well as other objects and advantages, will be fully understood from a consideration of the following description and from the accompanying drawings, in which:

FIG. 1 is an elevation view of a first modification of a valve according to the invention;

FIG. 2 is an end view of the top or cover of the valve of FIG. 1, looking upward at the sloping ceiling surface;

FIG. 3 is a plan view of the valve of FIG. 1 with the top or cover removed, looking downward at the sloping floor surface;

FIG. 4 is a developed sectional view of the valve taken along the line 4—4 of FIG. 2;

In the ensuing description, similar parts in the several figures are designated by the same reference characters.

Figure 6:
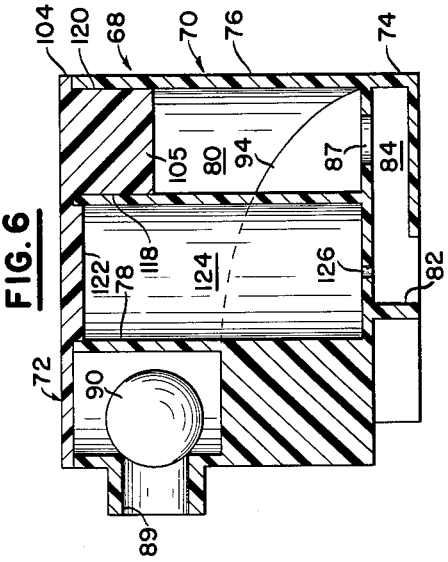
FIG. 6 is a sectional view taken along the line 6—6 of FIG. 5.

Referring to the modification shown in FIGS. 1, 2, 3 and 4, the sequencing valve, designated in its entirety by the reference numeral 10, comprises a hollow base 12 having a cover 14.

The hollow base 12 comprises an integral bottom section 16, an outer side wall 18, and an inner wall 20. The walls 18 and 20 are concentrically disposed and have the same height, and define, in cooperation with the bottom section 16 and the cover 14, an annular or endless fluid flow passage 22. The interior of the inner wall 20 forms a chamber 25 to which fluid under pressure is admitted through an inlet 24, and from which the fluid is discharged into the flow passage 22 through a pair of opposed ports 26 in the inner wall 20, all of which comprise an inlet means.

The other side wall 18 is provided with a pair of diametrically opposed outlets 28 and 29, under the control of a ball valve element 30.

The bottom wall or floor of the fluid flow passage 22 is formed with a pair of sloping floor surfaces 32 and 34. The surfaces are inclined in the same direction, and are interconnected by a pair of vertical walls 36 and 38 and connecting floor surfaces 40 and 42. One or both of the connecting floor surfaces 40 and 42 contain a bleed port 44 controlled by a normally open check valve 46.

The cover 14 includes a rim 48 and a depending construction 49 forming a pair of sloping ceiling surfaces 50 and 52, inclined in the same direction. The ceiling surfaces 50 and 52 are interconnected by a pair of vertical walls 54 and 56, and a pair of connecting ceiling surfaces 58 and 60. The outlets 28 and 29 are disposed in the upper portion of the fluid flow passage 22 in the niches formed by the vertical walls 54 and 56 and by the connecting ceiling surfaces 58 and 60 at the upper ends of the sloping surfaces 50 and 52.

The depending construction 49 has a radial thickness substantially equal to the radial width of the annular flow passage 22 and projects into the flow passage in contact with the inner and outer surfaces 62 and 64 of the flow passage to form a fluid tight connection. The depending construction 49 also includes a central circular projection 66 extending into the upper end of the chamber 25 forming a closure therefor. The rim 48 is securely fastened or cemented to the upper end of the hollow base 12 to form a unitary and leak proof structure.

The housing may be made of any suitable material, such as plastic or metal, and the ball valve element or elements may be made of any suitable material, such as plastic, metal, or wood.

While, in the illustrative construction shown in the drawings, two outlets and a single ball valve element are disclosed, it is evident that a greater number of outlets may be provided, depending upon the distribution lines to be served. If sequential flow of fluid is to be supplied to one distribution line at a time, the number of ball valve elements should be one less than the number of outlets; if sequential flow of fluid is to be supplied to two distribution lines at a time, the number of ball valve elements should be two less than the number of outlets, and so forth.

While a bleed port 44 is shown in only one connecting floor surface, it is evident that a similar bleed port can be provided in more than one connecting floor surface or in all connecting floor surfaces. Instead of inserting a check valve in the bleed ports, normally open bleed ports of small diameter may be provided, permitting a constant, restricted, bleed of fluid from the fluid flow passage 22. The bleed ports must be so disposed in the connecting floor surfaces so that the ball valve elements do not interfere with the flow of fluid therethrough.

The sequencing operation of the valve functions as the result of the alternate admission of fluid under pressure into and the cessation of fluid supply under pressure to the fluid flow passage. This alternate operation of the fluid supply is usually obtained by a valve or by a pump in the supply line. In the case where the sequencing valve is supplied with fluid under pressure from a tank or reservoir, or from a city main, a valve in the supply line to the sequencing valve is intermittently closed and opened either manually or automatically as by a timing device. If the fluid is supplied under pressure by a pump, sequential operation is obtained by intermittently energizing the motor which drives the pump or by intermittently clutching and unclutching the pump driving connection, which may be done manually or automatically under the control of a timing device.

The ball valve elements 30 may have the same density as the fluid passing through the fluid flow passage 22, may have a lesser density, or may have a greater density. If the ball valve elements have a less density or the same density as the fluid being controlled, a suitable bleed valve or valves must be provided, as shown in FIGS. 1–4. If the ball valve element or elements have a greater density than the fluid being controlled, no bleed valves are necessary.

The operation of the modification shown in FIGS. 1–4 will be described for a system having a valve element or elements as light as, or lighter than, the fluid passing through the flow passage 22 so as to float therein or thereon.

In FIG. 3, it should be noted that the ports 26 are aligned with the outlets 28 and 29 to direct a jet of water toward the outlets when fluid under pressure is admitted through the inlet passage 24 and chamber 25. While this arrangement is preferred, it should be understood that it is not essential to the operation of the sequencing valve, but that one or more ports may be disposed at other locations offset relative to the outlets to supply fluid into the flow passage 22 to discharge through the outlets 28 and 29.

FIGS. 3 and 4 illustrate one of the operative positions of the sequencing valve when fluid under pressure is being supplied through the inlet means comprising the inlet passage 24, chamber 25 and ports 26 into the fluid flow passage 22. Ball valve element 30, as shown in full lines, obstructs flow through the outlet 29, being retained on its seat by the pressure of fluid in the flow passage 22. At the same time, fluid under pressure is being discharged through the outlet 28 into the distribution line connected therewith, which may supply water to a series of spaced sprinkler heads or irrigation outlets. Check valve 46 is retained on its seat, against the opening force of its spring, by the fluid pressure in the flow passage 22, preventing the escape of fluid from the bleed port 44. Upon the cessation of fluid supply to the sequencing valve 10, either by the closing of the valve in the supply line or by de-energizing the motor which drives the supply pump, the pressure in the fluid flow passage 22 decreases to a value permitting the spring to open the check valve 46, allowing the rapid escape of fluid from the flow passage 22 through one or more bleed ports 44. As the liquid level drops in the flow passage the ball valve element 30 drops, under the force of gravity, from its position in register with the outlet 29 and floats on the surface of the receding water until the ball valve element engages the upper end of the sloping floor surface 34, and as the liquid level continues to recede, the ball valve element 30 rolls down to the bottom of the ramp or sloping surface 34 to rest on the surface 42 in the position shown in broken lines, in contact with the vertical wall 38, which functions as a stop. Both outlets 28 and 29 are open. When the valve in the fluid supply line is opened, or the pump supplying fluid thereto is energized, the fluid flow passage 22 quickly fills with fluid which flows from both ports 26, through the fluid flow passage 22, filling the flow passage, and discharges through both outlets 28 and 29. Ball valve element 30 is floated on the incoming fluid, and as the liquid level rises, the ball valve engages the sloping ceiling surface 52 which directs the ball valve element toward the outlet 28. The fluid flow through the flow passage 22, in cooperation with the sloping ceiling surface 52, carries the ball valve element toward the niche formed by the wall 56 and surface 60, and into register with the outlet 28, obstructing flow therefrom, the pressure of the fluid retaining the ball valve element on its seat. Meanwhile fluid under pressure is permitted to discharge through the unobstructed outlet 29, the relation of outflow to inflow, and the resistance to flow offered by the distribution line supplied by the outlet 29, maintaining sufficient pressure in the fluid flow passage 22 to force the normally open check valve or valves 46 against their seats and to retain them closed. This condition obtains until the fluid supply to the inlet passage 24 is again discontinued, whereupon the check valve 46 opens, in response to decreased pressure in the flow passage 22, to bleed fluid from the flow passage 22, whereby the force of gravity and the drop in liquid level permit the ball valve element 30 to move away from the outlet 28 and to roll down the sloping floor surface 32 to the bottom of the ramp to rest on the surface 40 in contact with the vertical wall or stop 36, in proximity with the outlet 29, so that, when fluid is again admitted into the flow passage 22, the ball valve element may be floated and moved by the flow of fluid, in cooperation with the sloping ceiling surface 50, toward the niche defined by the wall 54 and surface 58 into register with the outlet 29, as shown in full lines, permitting fluid flow through the unobstructed outlet 28.

It is evident that the same sequence of operations will take place in a construction having more than two outlets and more than one ball valve element.

While the walls 36 and 38 are shown as being disposed vertically, it is evident that they may have a slight incline and yet operate in the same manner as stops.

Figure 5:
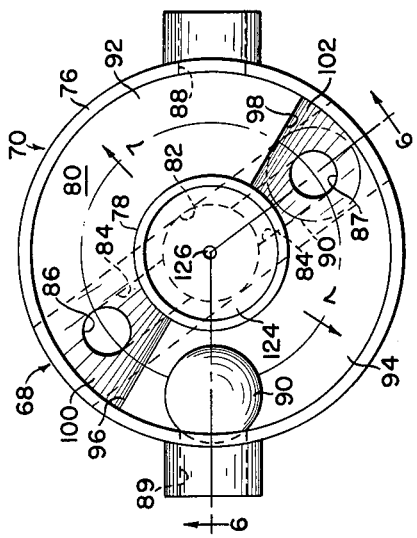
FIG. 5 is a top plan view of a second modification of a valve according to the invention, with the top removed, showing the interior of the valve housing.
Figure 7:
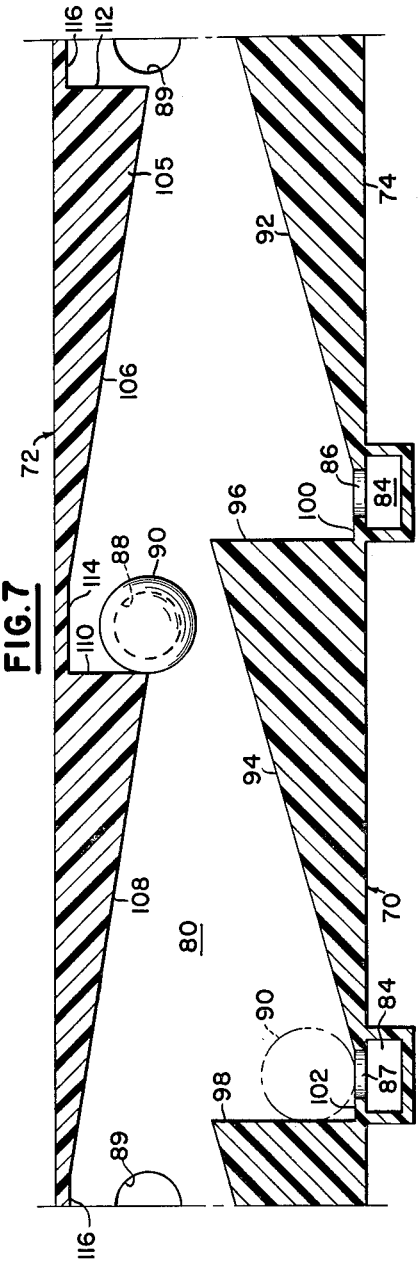
FIG. 7 is a developed sectional view taken along the line 7—7 of FIG. 5.

Referring to FIGS. 5, 6 and 7, it will be noted that the construction is very similar to that of the first modification of FIGS. 1, 2, 3 and 4. The sequencing valve is designated in its entirety by the reference numeral 68 and includes a hollow base 70 and a cover 72.

The hollow base 70 comprises a bottom section 74 having an upstanding outer side wall 76 and an inner wall 78, the walls having the same height and being disposed in concentric relation. The bottom section 74 and the side walls 76 and 78, in conjunction with the cover 72, define an annular or endless flow passage 80 to which fluid under pressure is supplied by an inlet means including an inlet passage 82 having a pair of opposed branches 84 and ports 86 and 87 into the fluid flow passage 80. The outer side wall 76 is provided with a pair of diametrically opposed outlets 88 and 89, angularly offset from the ports 86 and 87 as appearing in FIG. 7. A ball valve element 90, freely movable in the flow passage 80, sequentially obstructs flow through the outlets 88 and 89 in response to intermittent fluid flow and cessation of fluid flow through the passage as will appear hereinafter.

The bottom section forms a floor which is contoured to form a pair of sloping floor surfaces 92 and 94, sloping in the same direction and interconnected by a pair of vertical walls 96 and 98 and by a pair of connecting floor surfaces 100 and 102 as more clearly shown in FIG. 7.

The cover 72 includes a rim 104 adapted to engage the upper edge of the side wall 76 and a depending structure 105 contoured to provide a pair of sloping ceiling surfaces 106 and 108 inclined in the same direction. The two surfaces 106 and 108 are interconnected by a pair of vertical walls 110 and 112 and by a pair of connecting ceiling surfaces 114 and 116, as shown in FIG. 7. The depending structure 105 is annular in form, and has a radial thickness substantially equal to the radial width of annular flow passage 80 whereby the inner surface 118 and the outer surface 120 of the depending structure 105 are in contact with the outer surface of the inner wall 78 and with the inner surface of the outer wall 76, respectively, to form a fluid tight flow passage 80. The cover 72 may be secured or cemented to the hollow base 70 to provide an integral and leak-proof structure. The cover 72 includes a central circular projection 122 extending into a chamber 124 within the annular inner wall 78 to provide a closure for the chamber 124. An opening 126 between the inlet passage 82 and the chamber 124 permits the flow of fluid under pressure into the chamber 124 to balance pressures across the inner wall 78 and to allow the drainage of any fluid that might seep from the flow passage 80 into the chamber 124.

In this modification the ball valve element 90 has a greater density than that of the fluid flowing through the flow passage 80. It is important, therefore, that the fluid flowing through the flow passage positively carry the ball valve element to the outlet to be obstructed, and to this end the inlet ports 86 and 87 discharge into the flow passage 80 through the connecting floor surfaces 100 and 102, which are disposed at the feet of the inclines or sloping surfaces 92 and 94, respectively, where the ball valve element comes to rest when the supply of fluid to the sequencing valve is discontinued. The ball valve element 90, when resting on the inlet ports 86 or 87, may or may not prevent back flow through the inlet ports. If it is desired to drain all of the fluid from the sequencing valve, for instance to prevent freezing of water in the flow passage, the inlet ports 86 and 87 may be designed to permit backflow of fluid when the ball valve element 90 is resting thereon.

The operation of this modification is similar to the operation of the first modification described above. FIGS. 5, 6 and 7 illustrate an operating condition in which the ball valve element 90 registers with and obstructs fluid flow through the outlet 88, while the outlet 89 remains open for the discharge of fluid under pressure to the distribution line connected therewith. The pressure of the fluid in the flow passage 80 retains the ball valve element 90 on its seat. When the flow of fluid is discontinued, the pressure quickly drops in the flow passage 80 and the ball valve element 90 drops by force of gravity from its valve seat, sinks in the fluid remaining in the flow passage, and rolls down the incline or sloping surface 94, coming to rest on the connecting floor surface 102 at the bottom thereof in contact with the stop or vertical wall 98 as shown in broken lines in FIG. 7. The liquid level within the flow passage 80 will recede to the bottom level of the outlets 88 and 90 as the fluid flows through the outlets.

When fluid flow is again restored, the incoming fluid will enter the flow passage 80 through the inlet ports 86 and 87 and will discharge through the outlets 88 and 89.

Fluid entering through the inlet port 87 will lift the valve element 90 from its rest position and will carry it upwardly toward the outlet 89. The fluid flow, in cooperation with the sloping ceiling surface 108, will direct the ball valve element 90 toward and into register with the outlet 89 to obstruct the flow therefrom, while flow is permitted through the unobstructed outlet 88. When fluid flow is again discontinued, and pressure within the flow passage 80 drops, the ball valve element 90, under the force of gravity, will drop from registration with the outlet 89, will sink into the fluid remaining in the flow passage 80 and roll down the incline or sloping floor surface 92 to the bottom thereof, coming to rest on the connecting floor surface 100 against the vertical wall 96 over the inlet port 86, in proximity with the outlet 88, whereby, when fluid is again supplied to the fluid flow passage 80, the ball valve element 90 will be raised by the stream of fluid entering port 86 and carried by the stream toward and into register with the outlet 88 to the position shown in full lines, to obstruct fluid flow through the outlet 88 and permit flow through the unobstructed outlet 89. The sloping ceiling surface 108, in cooperation with the stream, will direct the ball valve element 90 toward the outlet 88.

Figure 8:
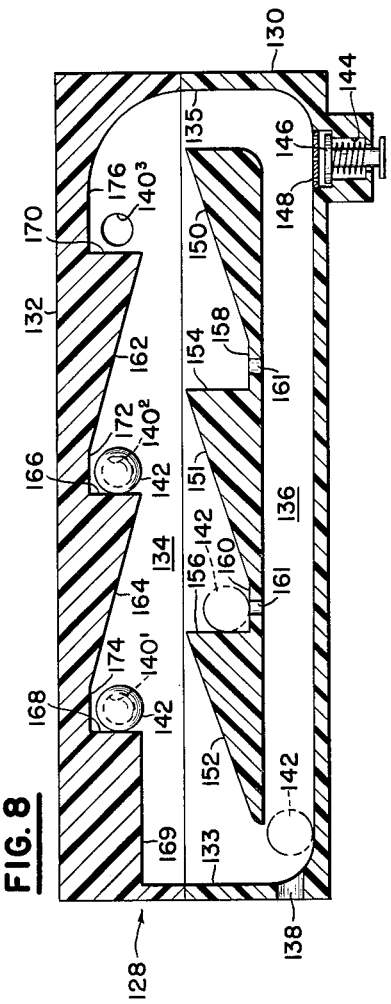
FIG. 8 is a vertical sectional view through a third modification of a valve according to the invention.

FIG. 8 illustrates a third modification in which the outlets are disposed in line along a straight section of a flow passage, and which arrangement utilizes a ball valve element having a density not greater than that of the fluid being regulated.

The sequencing valve 128 is rectangular in cross section and comprises a base 130 and a cover 132 providing a straight section 134 of a fluid flow passage. The base 130 includes an elongated return passage 136 having U-bends 133 and 135 at opposite ends connecting with opposite ends of the section 134. The section 134, U-bends 133 and 135, and the connected return passage 136 form an endless flow passage, to which fluid is admitted by an inlet 138 in one end of the return passage 136 directing incoming fluid axially of the return passage. The side wall of the section 134 of the flow passage includes a series of spaced outlets $140^1$, $140^2$ and $140^3$ which are sequentially opened for the discharge of fluid.

A plurality of ball valve elements 142 are freely movable in the endless flow passage comprising the section 134, the return passage 136, and the U-bends 133 and 135. Since at least one outlet 140 is to be unobstructed while the sequencing valve is in operation, the number of valve elements should be at least one less than the number of outlets. In the arrangement illustrated in FIG. 8, where three outlets are provided, two ball valve elements freely move within the flow passage to be moved into position to obstruct flow through two outlets while permitting flow through the unobstructed third outlet.

The bottom wall of the return passage 136 contains a bleed port 144 controlled by a normally open check valve 146. The inner end of the bleed port is covered by a screen 148 to permit free travel of the ball valve elements 142 through the return passage 136. As shown, the bleed port 144 discharges into the ambient air, but it is evident that a conduit may lead the discharged bleed fluid into one of the distribution lines which are connected with the outlets.

The bottom wall or floor of the section 134 of the flow passage is contoured to form a series of sloping floor surfaces or inclines 150, 151 and 152, all inclined in the same direction, which are interconnected by a pair of vertical walls 154 and 156 and by a pair of connecting floor surfaces 158 and 160. There should be as many sloping floor surfaces as there are outlets, and the surfaces are so disposed that the highest points are offset relative to the outlets to assure sequential opening of the outlets. Apertures 161 in the connecting floor surfaces 158 and 160 permit the flow of fluid between the passages 134 and 136.

The upper wall or ceiling of the flow passage 134 is contoured to form a pair of sloping ceiling surfaces 162 and 164 inclined in the same direction. The upper end of the surface 162 is connected with the lower end of the surface 164 by a connecting ceiling surface 172 and by a vertical wall 166, forming a niche in which the outlet $140^2$ is disposed. The lower end of the surface 162 is connected by a vertical wall 170 with a flat ceiling surface 176 defining a niche in which the outlet $140^3$ is located. The upper end of the ceiling surface 164 is connected by a connecting ceiling surface 174 and a vertical wall 168 with a flat ceiling surface 169, providing a niche in which the outlet $140^1$ is located.

FIG. 8 illustrates the parts in their operative position, in which the two ball valve elements 142, shown in solid lines obstruct the flow of fluid through the outlets $140^1$ and $140^2$, while fluid is discharged through the unobstructed outlet $140^3$. A portion of the fluid under pressure, admitted through the inlet 138, passes toward the right through the return passage 136, upward through the right hand U-bend 135 and through the outlet $140^3$. Another portion of the incoming fluid passes upwardly through the left hand U-bend 133 and toward the right through the section 134 of the flow passage and through the outlet $140^3$. The pressure of the fluid within the flow passage retains the valve elements 142 on their respective outlets, and retains the normally open check valve 146 on its seat to prevent the flow of fluid through the bleed port 144.

When the flow of fluid through the flow passage is terminated, as by closing a valve in the supply line or by deenergizing the supply pump, the pressure within the endless fluid flow passage quickly drops permitting the check valve 146 to open to bleed fluid from the section 134 and return passage 136. As the liquid level within the section 134 recedes, the two ball valve elements, under the force of gravity, move from register with the outlets $140^1$ and $140^2$. If the ball valve elements have a density less than that of the fluid in the flow passage, they will float on the surface of the fluid, and if the density of the ball valve elements is the same as the density of the fluid, the valve elements will remain suspended within the fluid. As the level continues to recede, the two ball valve elements contact the sloping floor surfaces 151 and 152, respectively, and roll toward the left, one ball valve element coming to rest on the connecting floor surface 160 in contact with the vertical wall 156, and the other ball valve element coming to rest within the return passage 136, as shown in broken lines.

If the return passage 136 is inclined toward the right, the ball valve element will continue to roll down the incline to the right hand end. The return passage has a cross section greater than the cross section of the ball valve element, permitting unrestricted rolling of the valve element through the return passage.

When the fluid supply is resumed, the incoming fluid through the inlet 138 will split. One portion, traveling through the return passage 136, will sweep along with it the ball valve, carrying the valve element through the right hand U-bend 135 and upward into register with the outlet $140^3$ to obstruct flow therefrom, while some of this portion will continue toward the outlets $140^2$ and $140^1$. Another portion of the fluid entering at 138 will flow upwardly through the U-bend 133 toward the three outlets. The portions entering from the opposite ends of the section 134 of the flow passage quickly raise the level therein. Fluid also enters the section 134 through the apertures 161, jetting the valve element 142 upwardly. If the valve elements are lighter than the fluid, they will float on the fluid. If the valve elements have a density equal to that of the fluid, they will be suspended in the fluid and will be carried with the fluid toward the outlets. The ball valve element 142, in contact with the vertical wall 156, will rise until it meets the sloping ceiling surface 164 which, in cooperation with the fluid flow, will direct the ball valve element toward and into register with the outlet $140^1$ to obstruct flow therefrom. Fluid discharges from the unobstructed outlet $140^2$. When the supply of fluid is again discontinued, the fluid pressure drops and the liquid level recedes in section 134, the valve element 142 in register with the outlet $140^1$ drops and rolls down the incline or surface 152 to the dotted line position adjacent the inlet 138, while the ball valve element 142 in register with the outlet $140^3$ drops and rolls down the surface 150 to the surface 158 at the foot thereof into contact with the vertical wall 154. When fluid flow is resumed, the ball valve element 142 adjacent the inlet 138 is carried and/or floated into register with the outlet $140^3$ and the ball valve element 142 at the foot of the surface 150 is carried and/or floated, in cooperation with the sloping ceiling surface 162, and directed toward and into register with the outlet $140^2$, whereby the outlets $140^2$ and $140^3$ will be obstructed, while fluid is discharged through the unobstructed outlet $140^1$. Similarly, in an obvious manner, when the fluid supply is again interrupted and initiated, the ball valve elements 142 will obstruct flow through the outlets $140^1$ and $140^2$, permitting the discharge through unobstructed outlet $140^3$.

Figure 9:
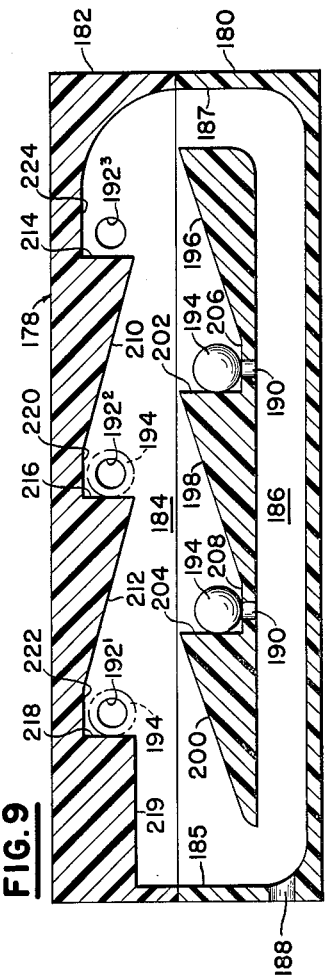
FIG. 9 is a vertical sectional view through a fourth modification of a valve according to the invention.

The modification illustrated in FIG. 9, similar to that shown in FIG. 8, is adapted for operation with ball valve elements having a density greater than that of the fluid flowing through the flow passage.

The sequencing valve, designated in its entirety by the reference numeral 178, comprises a base 180 and a cover 182 adapted to be sealed in mating relation as shown. The housing is elongated, as shown, and is rectangular in cross section, to provide an endless flow passage including a straight section 184 and a return passage 186, the return passage being disposed below the section 184 and interconnected with the opposite ends thereof by a pair of U-bends 185 and 187.

Fluid is admitted into one end of the return passage 186 through an inlet port 188. A plurality of apertures 190 permit the flow of fluid from the return passage 186 into the section 184. The section 184 includes a series of spaced outlets $192^1$, $192^2$ and $192^3$ connected with distribution lines, not shown. A number of ball valve elements, at least one less than the number of outlets, are freely movable in the endless flow passage under the force of gravity and the force of the fluid flowing therein, to produce the sequencing operation of the valve in response to the alternate flow and cessation of flow through the passage.

The interior of the base 180 is contoured to form a series of sloping floor surfaces 196, 198 and 200, inclined in the same direction, which are interconnected by vertical walls 202 and 204 and by connecting floor surfaces 206 and 208. Similarly, the interior of the cover 182 is contoured to form a series of spaced sloping ceiling surfaces 210 and 212, inclined in the same direction. The lower end of the ceiling surface 210 connects, by a vertical wall 214, with a ceiling surface 224 at the upper end of the U-bend 187, providing a niche in which the outlet $192^3$ is disposed. A vertical wall 216 and connecting ceiling surface 220 interconnect the sloping surfaces 210 and 212 to form a niche in which the outlet $192^2$ is located. A vertical wall 218 and a connecting ceiling surface 222 interconnect the upper end of the sloping ceiling surface 210 with a flat ceiling surface 219 at the upper end of the U-bend 185, and provide a niche in which the outlet $192^1$ is located.

FIG. 9 illustrates the position of the valve elements 194 when no fluid is supplied to the sequencing valve 178. The two ball valve elements 194, as shown in full lines, lie at rest on the feet of the inclines or sloping floor surfaces 196 and 198 on the connecting floor surfaces 206 and 208 in contact with the vertical walls 202 and 204. The return passage 186 is filled with fluid as are also the U-bends 185 and 187 and the straight section 184 to the level of the lower part of the outlets $192^1$, $192^2$ and $192^3$. The ball valve elements 194, having a density greater than that of the fluid in the passages, sinks in the fluid to the positions shown.

When fluid is supplied through the inlet port 188, fluid under pressure flows through the return passage 186, the U-bends 185 and 187, the inlets 190, into the section 184 and thence through the outlets 192¹, 192² and 192³. The fluid jetting from the apertures 190 lifts the ball valve elements off the connecting floor surfaces 206 and 208 and the streams of fluid flowing toward the outlets, in cooperation with the sloping ceiling surfaces 210 and 212, carry with them the ball valve elements 194, the surfaces 210 and 212 directing the ball valve elements toward the niches and into register with the outlets 192¹ and 192² as shown in broken lines to obstruct flow therethrough. The valve elements are retained on their respective seats by the fluid pressure existing in the flow passage. Outlet 192³, being unobstructed, discharges fluid into the connected distribution line.

The cessation of fluid supply to the inlet port 188 results in a decrease in the pressure in the flow passage. The ball valve elements 194, under the force of gravity, drop from register with the outlets 192¹ and 192², and sink through the fluid within the section 184. The liquid level recedes to a point equal to the lowest point of the outlets. The ball valve element 194 which dropped from the outlet 192¹ engages the sloping surface 200 and rolls toward the left, through the U-bend 185 to the left hand end of the return passage 186 adjacent the inlet port 188, or, if the return passage 186 is inclined toward the right, the ball valve element will roll toward the right to the lowest point. The cross section of the return passage 186 is sufficiently greater than that of the ball valve element to permit the described rolling action. The ball valve element 194 which dropped from the outlet 192² engages the sloping surface 198 and rolls down the incline to come to rest on the connecting floor surface 208 in contact with the vertical wall 204. The apertures 190 may be designed so that they form seats for the ball valves elements 194, but it is preferred that they be designed to permit leakage from the section 184 into the return passage 186 when the valve elements are at rest on the connecting floor surfaces 206 and 208 so that drainage of the section 184 and return passage 186 is permitted through the inlet port 188.

When the fluid supply is resumed, the incoming fluid will enter the section 184 through the inlet port 188, return passage 186, U-bends 185 and 187, and the apertures 190. The ball valve element 194 in the return passage 186 will be carried along with the stream through the U-bend 187 and into register with the outlet 192³ to obstruct flow therefrom. The niche formed by the wall 214 and the surface 224 assists in directing the fluid and valve into the outlet 192³. The stream of fluid jetting through the aperture 190 will lift the ball valve element 194 from the connecting floor surface 208 to be carried by the stream and directed by the sloping surface 212 toward the niche formed by the vertical wall 218 and the connecting ceiling surface 222, into register with the outlet 192¹. The fluid pressure within the section 184 retains the ball valve elements 194 on their respective seats and produces a discharge through the unobstructed outlet 192². The subsequent cessation of supply results in a dropping of the ball valve element 194 from register with the outlet 192¹ to sink in the liquid and to roll down the surface 200 through the U-bend 185 into the return passage 186, and the dropping of the other ball valve element from register with the outlet 192³ to sink through the liquid and to roll down the surface 196 to come to rest on the connecting floor surface 206 in contact with the vertical wall 202. When the supply is again resumed, the incoming fluid will carry the ball valve element 194 from the return passage 186 into register with the outlet 192³ and the ball valve element resting on the connecting floor surface 206 into register with the outlet 192², whereby the fluid pressure will retain the ball valve elements on their respective seats while producing a discharge through the unobstructed outlet 192¹. In a similar manner, the cessation of supply will permit the ball valve elements 194 to drop from the outlets 192² and 192³ to sink through the liquid and to roll down the sloping surfaces 196 and 198 to the positions shown in full lines.

It is evident, with reference to the modifications illustrated in FIGS. 8 and 9, that the return passages 136 and 186 need not be straight, as shown, but may be curved, and that these return passages need not underlie the sections 134 and 184, respectively, but may be disposed to one side thereof, just so that the bottom walls of the return passages 136 and 186 should not be at a higher elevation than the bottom of the inclined surfaces in the bottom walls of the sections 134 and 184, respectively.

It should be noted, from an inspection of the modifications shown in FIGS. 8 and 9, that each of the return passages 136 and 186 constitutes, in effect, wall surfaces providing a niche interconnecting the low point of a bottom wall inclined surface with the adjoining high point of an inclined surface in the bottom wall at opposite ends of the elongated sections 134 and 184.

While, in the above descriptions of operation, it was assumed that the sequencing valves were used in conjunction with an irrigation system, it is evident that it has wider application, and can be used wherever a definite sequencing operation of a fluid is desired, such as, for example, in oil fields, to deliver oil from a producing well to a number of tanks, or to deliver oil from a tank to a number of tank cars, or in water or sewage aeration systems.

It may be noted, in the several modifications disclosed, that there is provided an endless flow passage through which the fluid flows under pressure, and that this passage includes two or more outlets through which the fluid may be sequentially discharged. Sloping upper and lower surfaces are provided, which are inclined to advance each ball valve element in a single direction in sequence from one outlet to the next outlet. The number of ball valve elements required depends upon the number of outlets to be controlled and on the number of outlets to be left unobstructed. The number of ball valve elements must be at least one less than the number of outlets. If only one outlet is to be left unobstructed, the number of ball valve elements must be one less; if two outlets are to be left unobstructed, the number of valve elements must be two less, and so on. The upper walls are interconnected to form niches, there being an outlet in each niche. The upper walls are so contoured that the ball valve elements which may either float on the liquid or sink therein, are directed toward the next succeeding outlet to register therewith and to be retained in position by fluid pressure. When the supply of fluid is discontinued, gravity causes the ball valve elements to drop from register with the outlet when the pressure decreases. In the case of floating ball valve elements, bleed ports permit the drainage of water when the pressure drops. If the valve elements are heavier than the liquid, they will sink through the liquid, and bleed ports are not necessary. In either type, the lower wall surfaces are inclined to permit the ball valve elements to roll, under the force of gravity, down their slopes to a position at rest at the foot of the slope and in proximity with the next succeeding outlet so that, when fluid flow is resumed, the valve elements are floated and/or carried by the stream, and are directed, by the upper sloping wall surfaces, toward the outlets.

Having fully described by invention, it is to be understood that I do not wish to be limited to the details set forth herein but that various changes may be made in the details and proportions without departing from the principles of the invention or from the scope of the annexed claims.

I claim:

1. A sequencing valve, comprising: a housing having upper, lower and side walls defining an annular flow passage; inlet means to said passage and a series of spaced outlets therefrom; valve means, not more than one less than the number of outlets, having a density greater than that of the fluid being controlled, said valve means freely movable in said flow passage and respectively cooperating with at least one of said outlets to control the flow of fluid therefrom; said upper and lower walls having a series of inclined surfaces sloping in opposite directions respectively, so as to advance the valve means in a single direction through said flow passage, niches interconnecting the high points of the inclined surfaces with adjoining low points, the niches in the lower wall being circumferentially offset relative to the niches in the upper wall, said outlets being disposed in the niches in said upper wall and said inlet means including openings in the lower wall, whereby said inclined surfaces are cooperable with said valve means and to a flow of fluid from said inlet means and through said passage to direct each valve means from a niche in the lower wall to a niche in the upper wall to obstruct flow through the outlet therein and to be maintained in such obstructing position by fluid pressure in said flow passage, and movable by the force of gravity, upon cessation of fluid flow through said flow passage and the lowering of fluid pressure therein, from said obstructing position and to be moved down an inclined surface of a lower wall to a niche at the foot of said inclined surface adjacent an inlet opening therein, from which latter position said valve means may be moved into a different position by the force of fluid flow from said inlet means directed against said valve means and by an inclined upper wall surface into register with a next outlet to obstruct flow therefrom when fluid flow is restored through said flow passage.

2. A sequencing valve, comprising: a valve housing having inlet means and at least two spaced outlets; ceiling, side and floor walls within said housing providing an endless flow passage interconnecting said inlet means and said outlets, said walls including a series of interconnected sloping ceiling surfaces and a series of interconnected sloping floor surfaces, means interconnecting the high point of a ceiling surface with the low point of an adjoining ceiling surface, and means interconnecting the high point of a floor surface with the low point of an adjoining floor surface, said inlet means being disposed at the low points of said sloping floor surfaces and said outlets being disposed at the high points of said ceiling surfaces, the high and low points of a sloping ceiling surface being offset longitudinally of said flow passage relative to the high and low points of a sloping floor surface so that the low point of a floor surface is disposed between the high and low points of a ceiling surface; valve means, not more than one less than the number of outlets, freely movable in said flow passage, said valve means having a density greater than that of the controlled fluid and cooperating with said outlets to control flow through said outlets; said sloping ceiling surfaces being inclined in a direction opposite to the inclination of the sloping floor surfaces to advance said valve means in a single direction through said flow passage; whereby each valve means is freely movable by the force of fluid flow from said inlet means through said flow passage against said valve means, in cooperation with said sloping surfaces, from a position adjacent an inlet means at the foot of one of said floor surfaces in proximity with a certain outlet to a position obstructing said certain outlet to be maintained in such obstructing position by fluid pressure in said flow passage, and movable by the force of gravity, upon cessation of fluid flow through said flow passage and the lowering of fluid pressure therein, from said obstructing position and to be moved down the incline of a floor surface to a position adjacent an inlet means at the foot of said floor surface, from which latter position said valve means may be moved into a different position by the force of fluid flow directed against said valve means and by a sloping ceiling surface into register with a next outlet, to obstruct flow therefrom, when fluid flow is restored through said inlet means and through said flow passage.

3. A sequencing valve as defined in claim 2, in which said means interconnecting the high point of a ceiling surface with the low point of an adjoining ceiling surface provides niches, said outlets being disposed in said niches.

4. A sequencing valve as defined in claim 2, in which said means interconnecting the high point of a ceiling surface with the low point of an adjoining ceiling surface provides niches, said outlets being disposed in a side wall of said niches.

5. A sequencing valve as defined in claim 2, in which said means interconnecting the high point of a floor surface with the low point of an adjoining floor surface defines niches, and in which said inlet means are located in said niches.

6. A sequencing valve, comprising: a housing including an endless flow passage defined by an elongated section and a return passage interconnecting opposite ends of said elongated section, said flow passage having upper, side and lower walls; the upper wall and lower wall of said elongated section being contoured to form a series of inclined surfaces; wall surfaces, providing niches, interconnecting the high point of an inclined surface with the low point of an adjoining inclined surface in the upper wall, the low point of one inclined surface in the lower wall directly connecting with said return passage, and wall surfaces, providing niches, interconnecting the other low points of the inclined surfaces in the lower wall with adjoining high points; the inclined surfaces in the upper wall sloping in an opposite direction relative to the inclined surfaces in the lower wall; an outlet at each niche in the upper wall and an inlet means in each niche in the lower wall and in said return passage; ball valve means, having a density greater than that of the fluid being controlled, freely movable in said flow passage, there being at least one ball valve means less than the number of outlets; the inclined surfaces being disposed so that the high points in the lower wall are offset, axially of the elongated section, relative to the high points in the upper wall, whereby each valve means is freely movable by the force of fluid flow against said valve means from said inlet means through said flow passage, in cooperation with said inclined surfaces, from a position adjacent an inlet means at the foot of an inclined surface in the lower wall and in said return passage to a position obstructing at least one outlet to be maintained in such obstructing position by fluid pressure in said flow passage, and movable by the force of gravity, upon cessation of fluid flow through said flow passage and the lowering of fluid pressure therein, from said obstructing position and to be moved down the inclined surface of a lower wall to a position adjacent an inlet means at the foot of said inclined lower wall, from which latter position said valve means may be moved into a different position by the force of fluid flow directed against said valve means and by said inclined upper wall surfaces into register with said next outlet to obstruct flow therefrom, when fluid flow is restored through said inlet means and through said flow passage.

7. A sequencing valve as defined in claim 6, in which said elongated section and said return passage are substantially parallel with one another.

8. A sequencing valve as defined in claim 6, in which said return passage underlies said elongated section.

9. A sequencing valve as defined in claim 2, in which each valve means is spherical.

10. A sequencing valve as defined in claim 6, in which said inlet means in said return passage is disposed in one end to discharge axially thereof.

11. A sequencing valve as defined in claim 6, in which said inlet means in the niches in the bottom wall are connected with said return passage.

No references cited.

ISADOR WEIL, *Primary Examiner.*